US012786916B2

(12) United States Patent
Valencia Reyes et al.

(10) Patent No.: US 12,786,916 B2
(45) Date of Patent: Nov. 3, 2026

(54) TIME SYNCHRONIZATION USING A MANAGEMENT CONTROLLER AND AN OUT OF BAND COMMUNICATION CHANNEL

(71) Applicant: Dell Products L.P., Round Rock, TX (US)

(72) Inventors: Luis Antonio Valencia Reyes, Waxahachie, TX (US); Richard M. Tonry, Georgetown, TX (US); Abeye Teshome, Austin, TX (US); Bassem El-Azzami, Austin, TX (US); Mohit Arora, Frisco, TX (US); Vinodkumar Vasudev Ottar, Mckinney, TX (US); Adolfo Sandor Montero, Pflugerville, TX (US); Rajaravi Chandra Kollarapu, Allen, TX (US)

(73) Assignee: Dell Products L.P., Round Rock, TX (US)

( * ) Notice: Subject to any disclaimer, the term of this patent is extended or adjusted under 35 U.S.C. 154(b) by 334 days.

(21) Appl. No.: 18/425,206

(22) Filed: Jan. 29, 2024

(65) Prior Publication Data

US 2025/0247805 A1 Jul. 31, 2025

(51) Int. Cl.
*H04W 56/00* (2009.01)

(52) U.S. Cl.
CPC .................................. *H04W 56/005* (2013.01)

(58) Field of Classification Search
CPC ............. H04W 56/00; H04W 56/0005; H04W 56/001; H04W 56/002; H04W 56/0015; H04W 56/003
See application file for complete search history.

(56) References Cited

U.S. PATENT DOCUMENTS

| | | | |
|---|---|---|---|
| 8,042,182 | B2 | 10/2011 | Milani Comparetti et al. |
| 8,615,785 | B2 | 12/2013 | Elrod et al. |
| 8,924,620 | B2 | 12/2014 | Harriman et al. |
| 9,215,244 | B2 | 12/2015 | Ayyagari et al. |

(Continued)

FOREIGN PATENT DOCUMENTS

| | | | | | |
|---|---|---|---|---|---|
| CN | 109996326 A | * | 7/2019 | .......... | H04W 56/009 |
| CN | 112004263 B | * | 5/2023 | .......... | H04W 56/004 |

(Continued)

*Primary Examiner* — Phong La

(74) *Attorney, Agent, or Firm* — WOMBLE BOND DICKINSON (US) LLP

(57) ABSTRACT

Methods and systems for managing a data processing system are disclosed. To manage the data processing system, a management controller may be included in the data processing system. The management controller may participate in time synchronization for the data processing system. To do so, the management controller may obtain true time values from a trusted time server via an interaction using an out of band communication channel. The true time values may be used to update any number of clocks hosted by the management controller and/or hardware resources of the data processing system. Therefore, software applications may utilize reliable time data to perform computer-implemented services. Doing so may decrease a likelihood of compromise of the data processing system and/or true time values used by the data processing system to perform the computer-implemented services.

20 Claims, 8 Drawing Sheets

(56) References Cited

U.S. PATENT DOCUMENTS

| | | | |
|---|---|---|---|
| 9,529,602 | B1 | 12/2016 | Swierk |
| 9,734,169 | B2 | 8/2017 | Redlich et al. |
| 10,176,308 | B2 | 1/2019 | Mintz et al. |
| 10,298,670 | B2 | 5/2019 | Ben-Shaul et al. |
| 10,671,765 | B2 | 6/2020 | Swierk et al. |
| 11,036,902 | B2 | 6/2021 | Nicholas |
| 11,102,122 | B2 | 8/2021 | Seed et al. |
| 11,134,380 | B2 | 9/2021 | Fox et al. |
| 11,487,274 | B2 | 11/2022 | Valder et al. |
| 11,792,267 | B2 | 10/2023 | Kreiner et al. |
| 2007/0067466 | A1 * | 3/2007 | Gallant ................. G06F 21/805 709/229 |
| 2009/0054075 | A1 * | 2/2009 | Boejer ............... H04B 7/18532 342/357.49 |
| 2010/0024000 | A1 * | 1/2010 | Holtzman ............. H04L 9/3268 726/2 |
| 2010/0242106 | A1 | 9/2010 | Harris |
| 2010/0281178 | A1 * | 11/2010 | Sullivan ............. H04N 21/2668 709/245 |
| 2010/0325419 | A1 | 12/2010 | Kanekar |
| 2011/0087387 | A1 | 4/2011 | Safa-Bakhsh et al. |
| 2012/0266259 | A1 | 10/2012 | Lewis |
| 2013/0019239 | A1 | 1/2013 | Fontignie |
| 2014/0282936 | A1 | 9/2014 | Fitzgerald |
| 2014/0304497 | A1 | 10/2014 | Park |
| 2015/0371032 | A1 | 12/2015 | Puli |
| 2017/0357515 | A1 | 12/2017 | Bower, III |
| 2018/0039946 | A1 | 2/2018 | Bolte et al. |
| 2018/0082065 | A1 | 3/2018 | Liu |
| 2018/0137284 | A1 | 5/2018 | Oh |
| 2018/0351941 | A1 | 12/2018 | Chhabra |
| 2019/0034925 | A1 | 1/2019 | Sundaresan |
| 2020/0021378 | A1 * | 1/2020 | Aweya .................. H04J 3/0673 |
| 2020/0028699 | A1 | 1/2020 | Sharifi Mehr |
| 2020/0296436 | A1 * | 9/2020 | Dunker ............ H04N 21/44008 |
| 2020/0314115 | A1 | 10/2020 | Nabeesa |
| 2021/0034048 | A1 | 2/2021 | Hajizadeh |
| 2021/0073211 | A1 | 3/2021 | Wright, Sr. |
| 2021/0397716 | A1 | 12/2021 | Kovah |
| 2022/0038659 | A1 | 2/2022 | Michel |
| 2022/0383333 | A1 | 12/2022 | Young |
| 2023/0224294 | A1 | 7/2023 | Halemane |
| 2023/0246827 | A1 | 8/2023 | Luciani, Jr. |
| 2024/0214101 | A1 * | 6/2024 | Reilly ........................ G06F 1/14 |
| 2024/0329709 | A1 | 10/2024 | Wolford |
| 2025/0086200 | A1 * | 3/2025 | Hsieh .................... G06F 16/273 |
| 2025/0181859 | A1 | 6/2025 | Mouyade |
| 2025/0247805 | A1 * | 7/2025 | Valencia Reyes .. H04W 56/005 |

FOREIGN PATENT DOCUMENTS

| | | | | | |
|---|---|---|---|---|---|
| JP | 2011151571 | A | * | 8/2011 | |
| JP | 2020103589 | A | * | 7/2020 | ................ G01T 1/17 |
| WO | WO-2020015813 | A1 | * | 1/2020 | ............ H04J 3/0673 |
| WO | WO-2023046516 | A1 | * | 3/2023 | ............ H04J 3/0673 |
| WO | 2024102715 | A1 | | 5/2024 | |

* cited by examiner

TIME SYNCHRONIZATION USING A MANAGEMENT CONTROLLER AND AN OUT OF BAND COMMUNICATION CHANNEL

FIELD

Embodiments disclosed herein relate generally to managing a data processing system. More particularly, embodiments disclosed herein relate to systems and methods to manage time synchronization for a data processing system using a management controller and an out of band communication channel.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1A:
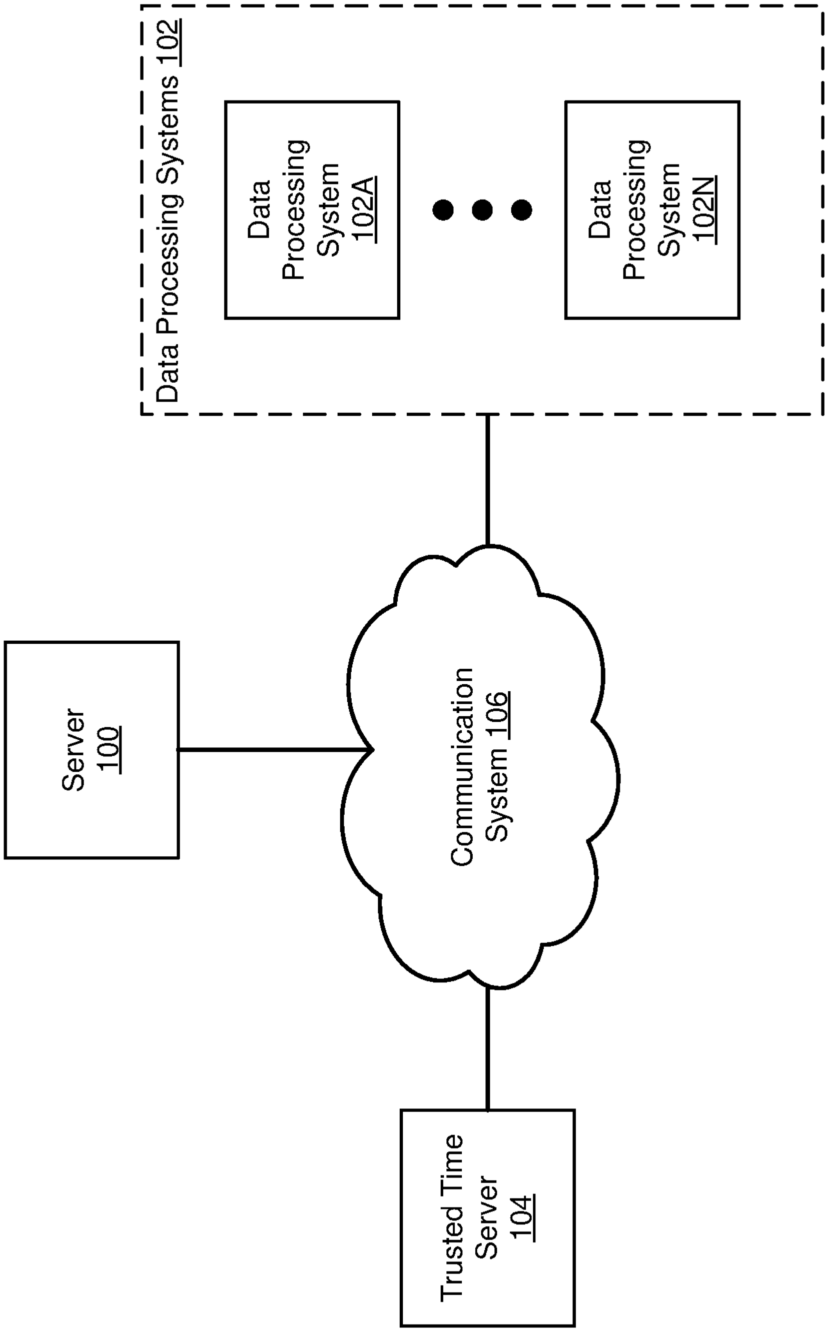
FIG. 1A shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing a data processing system. The data processing system may provide computer-implemented services to any type and number of other devices and/or users of the data processing system. The computer-implemented services may include any quantity and type of such services.

To provide the computer-implemented services, the data processing system may utilize true time values. The true time values may be obtained from a trusted time server and may be used to synchronize clocks used by the data processing system to perform the computer-implemented services.

However, time synchronization processes for the clocks may include querying the trusted time server and receiving true time values via in band communication channels of the data processing system. In band components of the data processing system and, therefore, in band communications may be vulnerable to compromise by a malicious entity (e.g., via man-in-the-middle attacks).

To perform time synchronization for the data processing system while bypassing the in band components (e.g., hardware resources) of the data processing system, the true time values may be obtained from the trusted time server by a management controller of the data processing system using an out of band communication channel.

To do so, the management controller may receive information from and/or provide information to remote entities (e.g., the trusted time server) without the information traversing the in band components and without utilizing a network stack hosted by the hardware resources. To do so, the data processing system may include a network module.

The network module may facilitate in band communications for the hardware resources and out of band communications for the management controller by maintaining multiple network endpoints. For example, a first network endpoint may be usable to direct communications to and from the hardware resources via a first communication channel and a second network endpoint may be usable to direct communications to and from the management controller via a second communication channel.

By doing so, communications usable by the management controller to update the operation of the data processing system (e.g., to synchronize clocks) may not need to traverse any in band components and, therefore, may be less likely to be compromised in the event of compromise of one or more in band components. In addition, the management controller and network module may be powered by a separate power domain from the hardware resources and, therefore, may remain powered if the hardware resources are depowered. Doing so may increase quality and/or availability of the computer-implemented services to a user of the data processing system.

In an embodiment, a method of managing a data processing system is provided. The method may include: obtaining, by a management controller of the data processing system and via an out of band communication channel, a true time value from a trusted time server; servicing, by the management controller and via a side band communication channel, a time request from hardware resources of the data processing system using the true time value; and providing, by the hardware resources, computer-implemented services using, at least in part, the true time value.

Servicing the time request may include: providing, by the management controller and via the side band communication channel, the true time value to the hardware resources; updating, by the hardware resources, a clock of the hardware resources to obtain an updated clock using the true time value; obtaining, by the hardware resources, a request for the true time value from a software application hosted by the hardware resources; and providing, by the hardware resources and using the updated clock, the true time value to the software application.

Servicing the time request may include: intercepting, by a management controller agent hosted by the hardware resources, the time request from a software application hosted by the hardware resources; providing, by the management controller agent and via the side band communication channels, the intercepted time request to the management controller; receiving, in response to the providing, the true time value from the management controller; and providing, by the management controller agent, the true time value to the software application.

The trusted time server may maintain a globally-implemented time standard and may provide information regarding the globally-implemented time standard.

The true time value may be provided to the management controller by a network module of the data processing system via the out of band communication channel.

The network module may be adapted to separately advertise network endpoints for the management controller and the hardware resources of the data processing system, the network endpoints being usable by the trusted time server to address communications to the hardware resources using an in band communication channel and the management controller using the out of band communication channel.

The management controller and the network module may be on separate power domains from the hardware resources so that the management controller and the network module are operable while the hardware resources are inoperable.

The out of band communication channel may run through the network module, and an in band communication channel that services the hardware resources may also run through the network module.

The network module may host a transmission control protocol/internet protocol (TCP/IP) stack to facilitate network communications via the out of band communication channel.

Providing the computer-implemented services may include: obtaining, by the hardware resources, data from a remote entity; cryptographically validating, by the hardware resources, the data; and checking, by the hardware resources and using the true time value, if the cryptographically validated data is stale; and in an instance of the checking where the cryptographically validated data is stale: rejecting the data for use in the computer-implemented services.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the method when the computer instructions are executed by the processor.

Figure 1B:
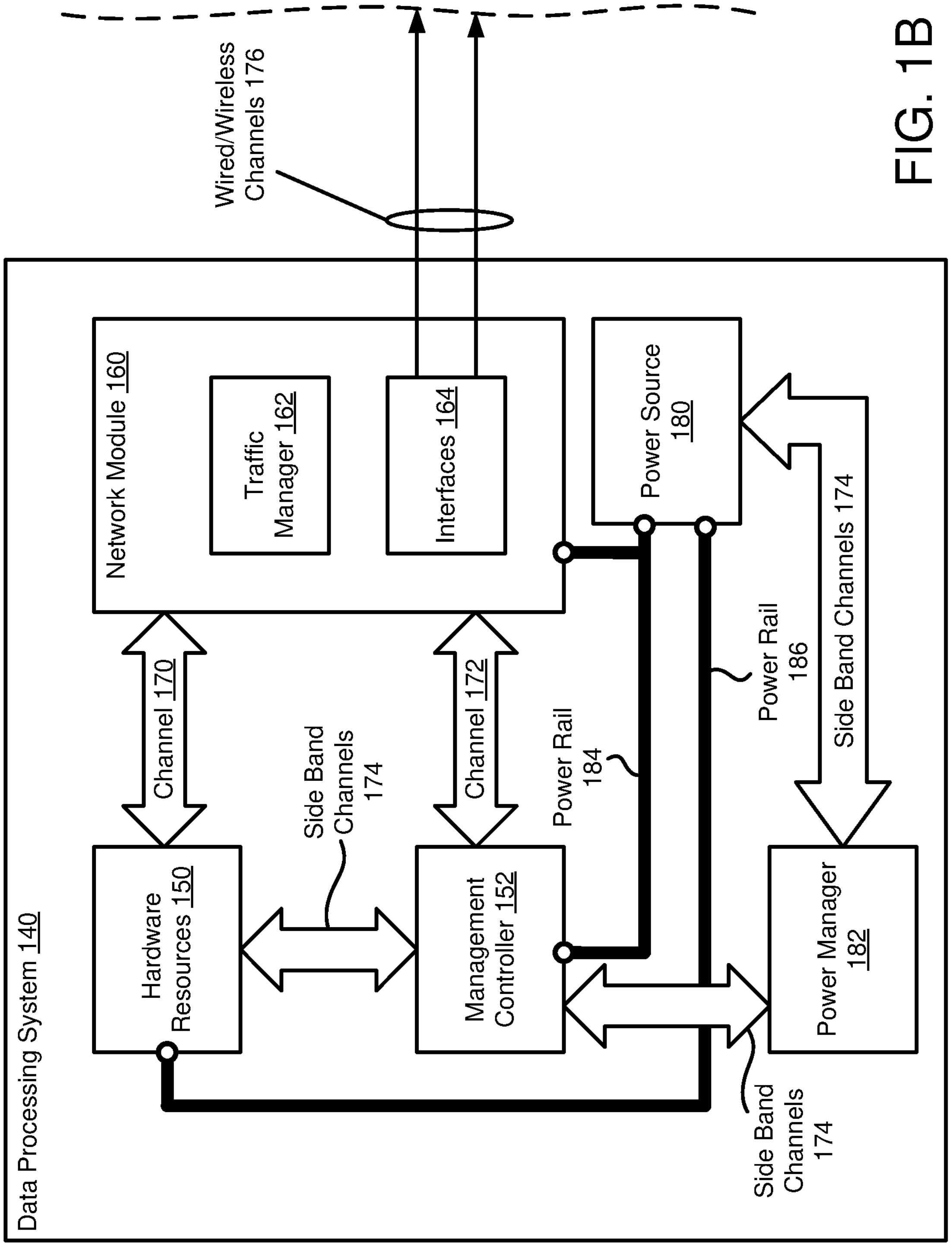
FIG. 1B shows a block diagram illustrating a data processing system in accordance with an embodiment.
Figure 1C:
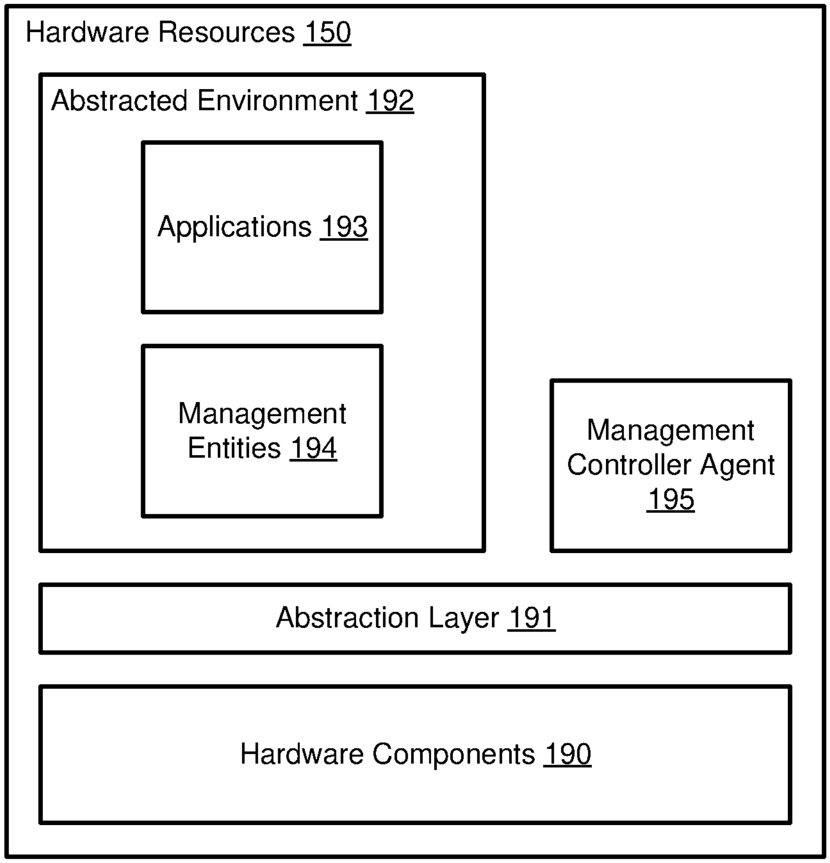
FIG. 1C shows a block diagram illustrating hardware resources of a data processing system in accordance with an embodiment.

Turning to FIG. 1A, a block diagram illustrating a system in accordance with an embodiment is shown. The system shown in FIG. 1A may provide for management of data processing systems that may provide, at least in part, computer-implemented services. The system may include any number of data processing systems 102 (e.g., computing devices) that may each include any number of hardware components (e.g., processors, memory modules, storage devices, communications devices). The hardware components may support execution of any number and types of applications (e.g., software components). Changes in available functionalities of the hardware and/or software components may provide for various types of different computer-implemented services to be provided over time. Refer to FIGS. 1B-1C for additional details regarding data processing systems 102.

The computer-implemented services may include any type and quantity of computer-implemented services. The computer-implemented services may include, for example, database services, data processing services, electronic communication services, and/or any other services that may be provided using one or more computing devices. The computer-implemented services may be provided by, for example, server 100, trusted time server 104, data processing systems 102 and/or any other type of devices (not shown in FIG. 1A). Other types of computer-implemented services may be provided by the system shown in FIG. 1A without departing from embodiments disclosed herein.

The computer-implemented services may be provided, at least in part, by hardware resources of data processing systems 102 and software applications hosted by the hardware resources. To provide the computer-implemented services, the hardware resources may obtain data from remote entities (e.g., other data processing systems, other servers). The data obtained from the remote entities may only be usable (to perform the computer-implemented services) within a particular duration of time. The duration of time may be dictated by any set of rules and/or by any entity (e.g., a user of data processing systems 102, a downstream consumer of the computer-implemented services).

To determine whether the data obtained from the remote entities is stale (e.g., whether the duration of time has elapsed), the hardware resources may read a time stamp associated with the data obtained from the remote entities. The hardware resources may maintain one or more clocks and may use the one or more clocks to determine whether the data obtained from the remote entities is stale (e.g., by comparing a time indicated by the one or more clocks to a time indicated by the time stamp).

However, the one or more clocks maintained by the hardware resources may drift over time and, therefore, may no longer be synchronized with a trusted time server (e.g., 104). Trusted time server 104 may maintain a globally-implemented time standard and the hardware resources may query the trusted time server according to a synchronization schedule to obtain a true time value. The true time value may be from a globally-recognized standard, such as Universal Coordinated Time (UTC).

Queries for true time values by the hardware resources may traverse in band components of data processing systems 102 and may utilize in band communication channels to interact with trusted time server 104. Doing so may make the true time value vulnerable to compromise by a malicious entity attempting to manipulate data processing systems 102 and/or the provided computer-implemented services (e.g., via a man-in-the-middle attack).

For example, the malicious entity may wish for data processing systems 102 to allow use of at least a portion of data that may be stale. To do so, the malicious entity may attempt to manipulate the true time value in transit to the hardware resources so that the clock used by the hardware resources may reflect a time that allows use of the at least the portion of the data.

In general, embodiments disclosed herein relate to systems, devices, and methods for obtaining true time values from trusted time server 104 without traversing in band components of data processing systems 102. To do so, data processing system 102A may include a management controller. The management controller may operate independently from the hardware resources of data processing system 102A and may be distinct from the hardware resources. Therefore, the management controller may provide management functionalities for data processing system 102A regardless of a status of one or more in band components (e.g., the hardware resources).

In addition, the management controller may receive information from and/or provide information to remote entities (e.g., other data processing systems, servers) without the information traversing the in band components and without utilizing a network stack hosted by the hardware resources. To do so, data processing system 102A may include a network module.

The network module may facilitate in band communications for the hardware resources and out of band communications for the management controller by maintaining multiple network endpoints. For example, a first network endpoint may be usable to direct communications to and from the hardware resources via a first communication channel (e.g., an in band communication channel) and a second network endpoint may be usable to direct communications to and from the management controller via a second communication channel (e.g., an out of band communication channel).

By doing so, communications usable by the management controller (e.g., true time values) may not need to traverse any in band components and, therefore, may be less likely to be compromised in the event of compromise of one or more in band components. In addition, the management controller and network module may be powered by a separate power domain from the hardware resources and, therefore, may remain powered if the hardware resources are depowered. Doing so may increase quality and/or availability of computer-implemented services to the user of data processing system 102A.

To provide the above noted functionality, the system may include server 100, data processing systems 102, and trusted time server 104. Each of these components is discussed below.

Data processing systems 102 may include any number of data processing systems 102A-102N. Data processing systems 102A-102N may synchronize their time with trusted time server 104 as part of providing computer-implemented services.

Trusted time server 104 may (i) maintain a globally-implemented time standard and (ii) provide information regarding the globally-implemented time standard to other entities. The globally-implemented time standard may be provided to data processing systems 102 and/or other devices for time synchronization purposes.

Trusted time server 104 may include an orchestrator and an internet of things (IoT) hub (e.g., a message broker for interactions between the orchestrator and other entities in the distributed environment). Trusted time server 104 may be implemented using any number of physical devices including an orchestrator and an IoT hub. The orchestrator may manage device registrations, entitlement certificates, and/or other information related to data processing systems 102. For example, the orchestrator may communicate with management controllers of data processing systems 102 to implement changes to entitlements for data processing systems 102.

The IoT hub may include a message broker service that directs communications between the orchestrator and other components of FIG. 1A. For example, the IoT hub may be responsible for providing communications from the orchestrator to a particular management controller (e.g., of data processing system 102A) over a particular communication channel of communication system 106.

Any of the components illustrated in FIG. 1A may be operably connected to each other (and/or components not illustrated) with communication system 106.

Communication system 106 may include one or more networks that facilitate communication between any number of components. The networks may include wired networks and/or wireless networks (e.g., and/or the Internet). The networks may operate in accordance with any number and types of communication protocols (e.g., such as the internet protocol).

Communication system 106 may be implemented with one or more local communications links (e.g., a bus interconnecting a processor of any of data processing systems 102, trusted time server 104, and server 100).

Communication system 106 may include out of band communication channels, in band communication channels, and/or other types of communication channels.

Refer to FIG. 1B for additional details regarding the management controller, network module, out of band communication channel, and/or hardware resources of data processing systems 102.

Turning to FIG. 1B, a diagram illustrating data processing system 140 in accordance with an embodiment is shown. Data processing system 140 may be similar to any of data processing systems 102 shown in FIG. 1A.

To provide computer-implemented services, data processing system 140 may include any quantity of hardware resources 150. Hardware resources 150 may be in band hardware components, and may include a processor operably coupled to memory, storage, and/or other hardware components.

The processor may host various management entities such as operating systems, drivers, network stacks, and/or other software entities that provide various management functionalities. For example, the operating system and drivers may provide abstracted access to various hardware resources. Likewise, the network stack may facilitate packaging, transmission, routing, and/or other functions with respect to exchanging data with other devices.

For example, the network stack may support transmission control protocol/internet protocol communication (TCP/IP) (e.g., the Internet protocol suite) thereby allowing hardware resources 150 to communicate with other devices via packet switched networks and/or other types of communication networks.

The processor may also host various applications that provide the computer-implemented services. The applications may utilize various services provided by the management entities and use (at least indirectly) the network stack to communicate with other entities.

However, use of the network stack and the services provided by the management entities may place the applications at risk of indirect compromise. For example, if any of these entities trusted by the applications are compromised, these entities may subsequently compromise the operation of the applications. For example, if various drivers and/or the communication stack are compromised, communications to/from other devices may be compromised. If the applications trust these communications, then the applications may also be compromised.

For example, to communicate with other entities, an application may generate and send communications to a network stack and/or driver, which may subsequently transmit a packaged form of the communication via channel 170 to a communication component, which may then send the packaged communication (in a yet further packaged form, in some embodiments, with various layers of encapsulation being added depending on the network environment outside of data processing system 140) to another device via any number of intermediate networks (e.g., via wired/wireless channels 176 that are part of the networks).

In addition, different configurations of hardware resources 150 and/or software resources may be implemented by data processing system 140 based on the type of computer-implemented services that are to be provided. Modifications to configurations of hardware resources 150 and/or the software resources may lead to downtime for data processing system 140 and may consume network bandwidth of channel 170.

To reduce the downtime of data processing system 140 and to reduce the likelihood of the applications and/or other in band entities from being indirectly compromised, data processing system 140 may include management controller 152 and network module 160. Each of these components of data processing system 140 is discussed below.

Management controller 152 may be implemented, for example, using a system on a chip or other type of independently operating computing device (e.g., independent from the in band components, such as hardware resources 150, of a host data processing system 140). Management controller 152 may provide various management functionalities for data processing system 140. For example, management controller 152 may monitor various ongoing processes performed by the in band components, may manage power distribution, thermal management, and/or other functions of data processing system 140.

To do so, management controller 152 may be operably connected to various components via side band channels 174 (in FIG. 1B, a limited number of side band channels are included for illustrative purposes, it will be appreciated that management controller 152 may communicate with other components via any number of side band channels). The side band channels may be implemented using separate physical channels, and/or with a logical channel overlay over existing physical channels (e.g., logical division of in band channels). The side band channels may allow management controller 152 to interface with other components and implement various management functionalities such as, for example, general data retrieval (e.g., to snoop ongoing processes), telemetry data retrieval (e.g., to identify a health condition/other state of another component), function activation (e.g., sending instructions that cause the receiving component to perform various actions such as displaying data, adding data to memory, causing various processes to be performed), and/or other types of management functionalities.

For example, to reduce the likelihood of indirect compromise of an application hosted by hardware resources 150, management controller 152 may enable information from other devices to be provided to the application without traversing the network stack and/or management entities of hardware resources 150. To do so, the other devices may direct communications including the information to management controller 152. Management controller 152 may then, for example, send the information via side band channels 174 to hardware resources 150 (e.g., to store it in a memory location accessible by the application, such as a shared memory location, a mailbox architecture, or other type of memory-based communication system) to provide it to the application. Thus, the application may receive and act on the information without the information passing through potentially compromised entities. Consequently, the information may be less likely to also be compromised, thereby reducing the possibility of the application becoming indirectly compromised. Similar processes may be used to facilitate outbound communications from the applications.

Management controller 152 may be operably connected to communication components of data processing system 140 via separate channels (e.g., 172) from the in band components, and may implement or otherwise utilize a distinct and independent network stack (e.g., TCP/IP). Consequently, management controller 152 may communicate with other devices independently of any of the in band components (e.g., does not rely on any hosted software, hardware components, etc.). Accordingly, compromise of any of hardware resources 150 and hosted component may not result in indirect compromise of any management controller 152, and entities hosted by management controller 152.

To facilitate communication with other devices, data processing system 140 may include network module 160. Network module 160 may provide communication services for in band components and out of band components (e.g., management controller 152) of data processing system. Specifically, an out of band communication channel (e.g., 172) that services management controller 152 and an in band communication channel (e.g., 170) that services hardware resources 150 may run through network module 160. Network module 160 may host a TCP/IP stack to facilitate network communications via the out of band communication channel. To do so, network module 160 may include traffic manager 162 and interfaces 164.

Traffic manager 162 may include functionality to (i) discriminate traffic directed to various network endpoints advertised by data processing system 140, and (ii) forward the traffic to/from the entities associated with the different network endpoints. For example, to facilitate communications with other devices, network module 160 may advertise different network endpoints (e.g., different media access control address/internet protocol addresses) for the in band components and out of band components. Thus, other entities may address communications to these different network endpoints. When such communications are received by network module 160, traffic manager 162 may discriminate and direct the communications accordingly (e.g., over channel 170 or channel 172, in the example shown in FIG. 1B, it will be appreciated that network module 160 may discriminate traffic directed to any number of data units and direct it accordingly over any number of channels).

Accordingly, traffic directed to management controller 152 may never flow through any of the in band components. Likewise, outbound traffic from the out of band component may never flow through the in band components.

To support inbound and outbound traffic, network module 160 may include any number of interfaces 164. Interfaces 164 may be implemented using any number and type of communication devices which may each provide wired and/or wireless communication functionality. For example, interfaces 164 may include a wide area network card, a WiFi card, a wireless local area network card, a wired local area network card, an optical communication card, a radio access network (RAN) card, a wide area network (WAN) card, and/or other types of communication components. These components may support any number of wired/wireless channels 176.

Thus, from the perspective of an external device, the in band components and out of band components of data processing system 140 may appear to be two independent network entities, that may independently addressable, and otherwise unrelated to one another.

To facilitate management of data processing system 140 over time, hardware resources 150, management controller 152 and/or network module 160 may be positioned in separately controllable power domains. By being positioned in these separate power domains, different subsets of these components may remain powered while other subsets are unpowered.

For example, management controller 152 and network module 160 may remain powered while hardware resources 150 is unpowered. Consequently, management controller 152 may remain able to communication with other devices even while hardware resources 150 are inactive. Similarly, management controller 152 may perform various actions while hardware resources 150 are not powered and/or are otherwise inoperable, unable to cooperatively perform various process, are compromised, and/or are unavailable for other reasons.

To implement the separate power domains, data processing system 140 may include a power source (e.g., 180) that separately supplies power to power rails (e.g., 184, 186) that power the respective power domains. Power from the power source (e.g., a power supply, battery, etc.) may be selectively provided to the separate power rails to selectively power the different power domains. A power manager (e.g., 182) may manage power from power source 180 is supplied to the power rails (e.g., by providing instructions via side band channels 174). Management controller 152 may cooperate with power manager 182 to manage supply of power to these power domains. Management controller 152 may communicate with power manager 182 via side band channels 174 and/or via other means.

In FIG. 1B, an example implementation of separate power domains using power rails 184-186 is shown. The power rails may be implemented using, for example, bus bars or other types of transmission elements capable of distributing electrical power. While not shown, it will be appreciated that the power domains may include various power management components (e.g., fuses, switches, etc.) to facilitate selective distribution of power within the power domains.

Figure 2A:
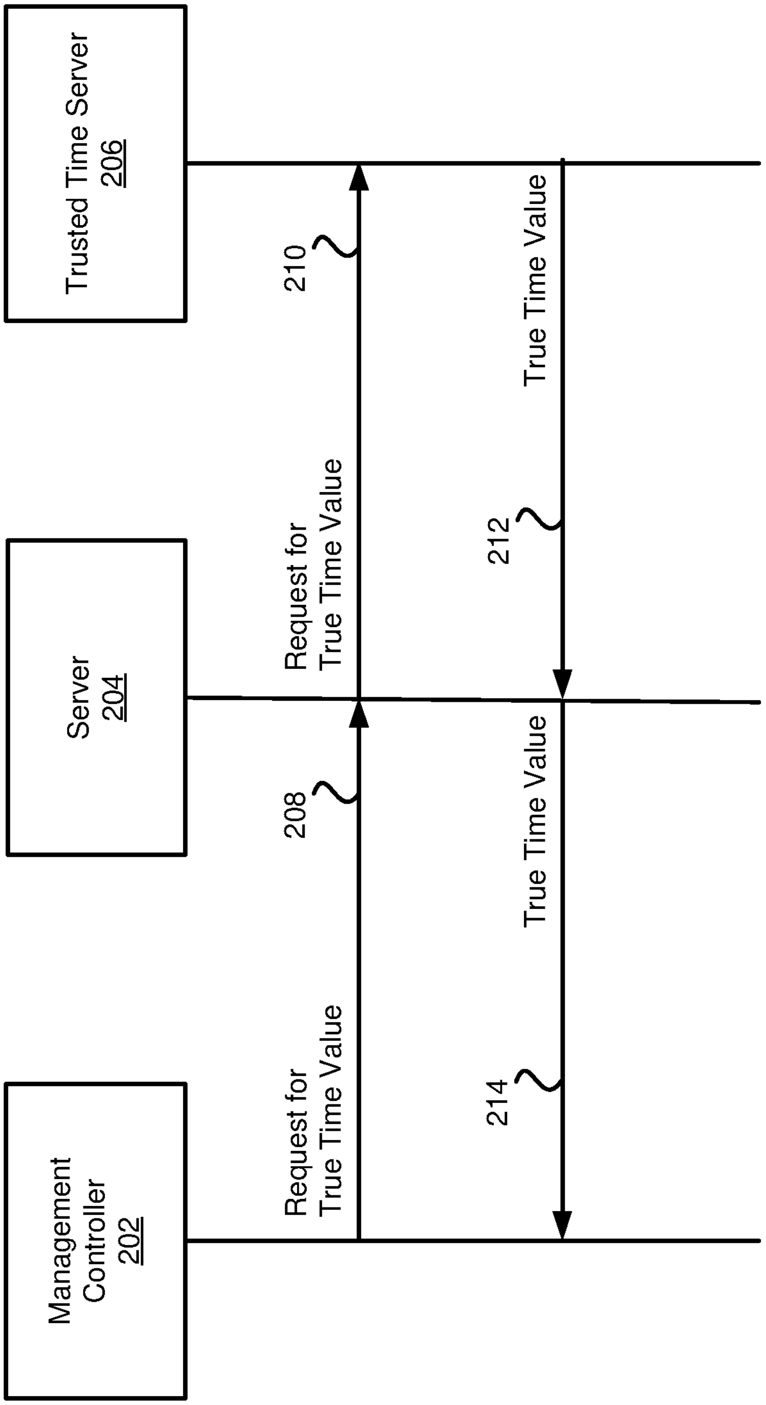
FIGS. 2A-2C show block diagrams illustrating data flow during time synchronization for a data processing system in accordance with an embodiment.
Figure 2B:
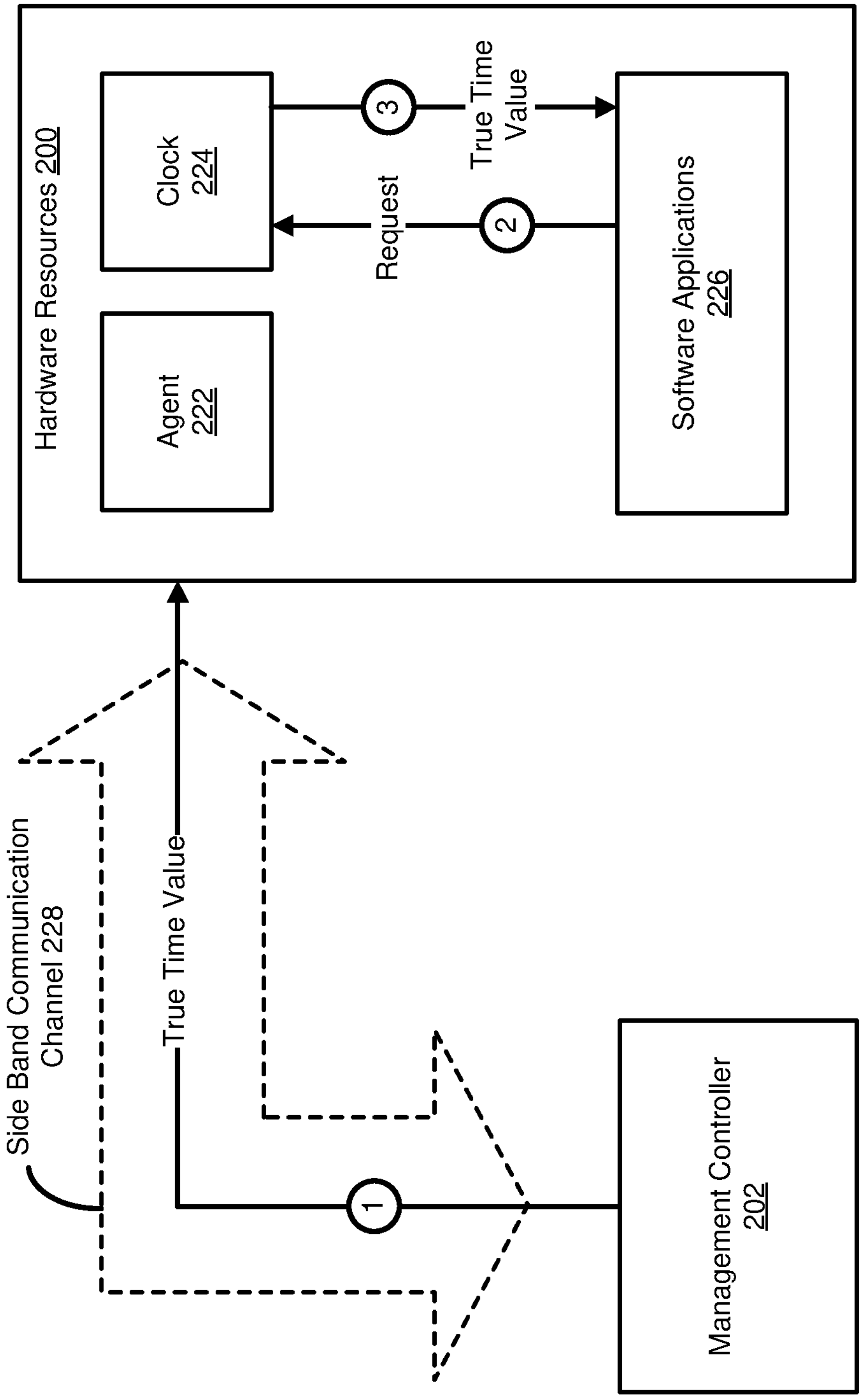
Figure 2C:
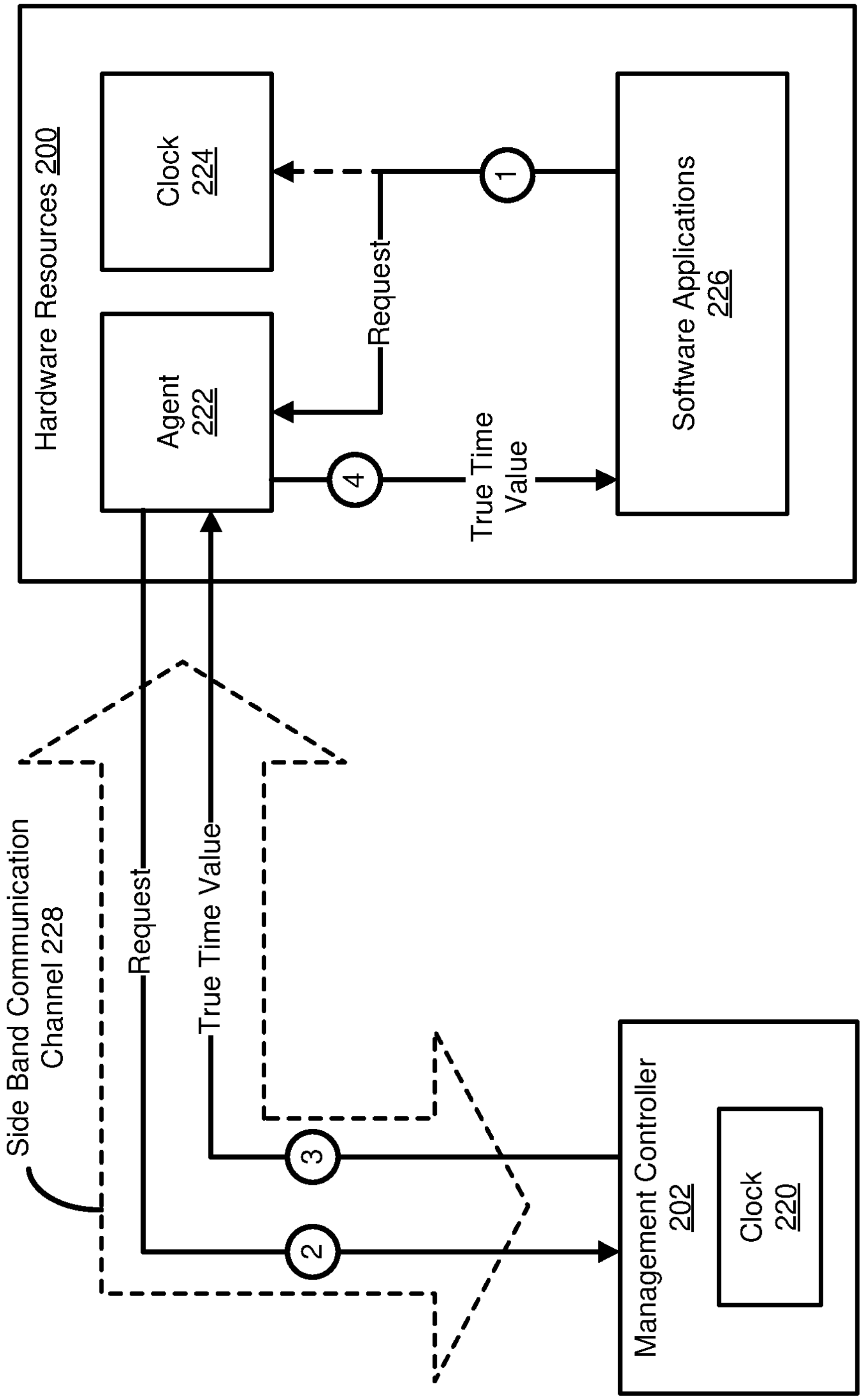

To provide its functionality, data processing system 140 may: (i) obtain, by management controller 152 and via channel 172, a true time value from a trusted time server (e.g., 104), (ii) service, by management controller 152 and via side band channels 174, a time request from hardware resources 150 using the true time value, and/or (iii) provide, by hardware resources 150, computer-implemented services using, at least in part, the true time value. Refer to FIGS. 2A-2C for additional details regarding obtaining true time values.

Figure 3:
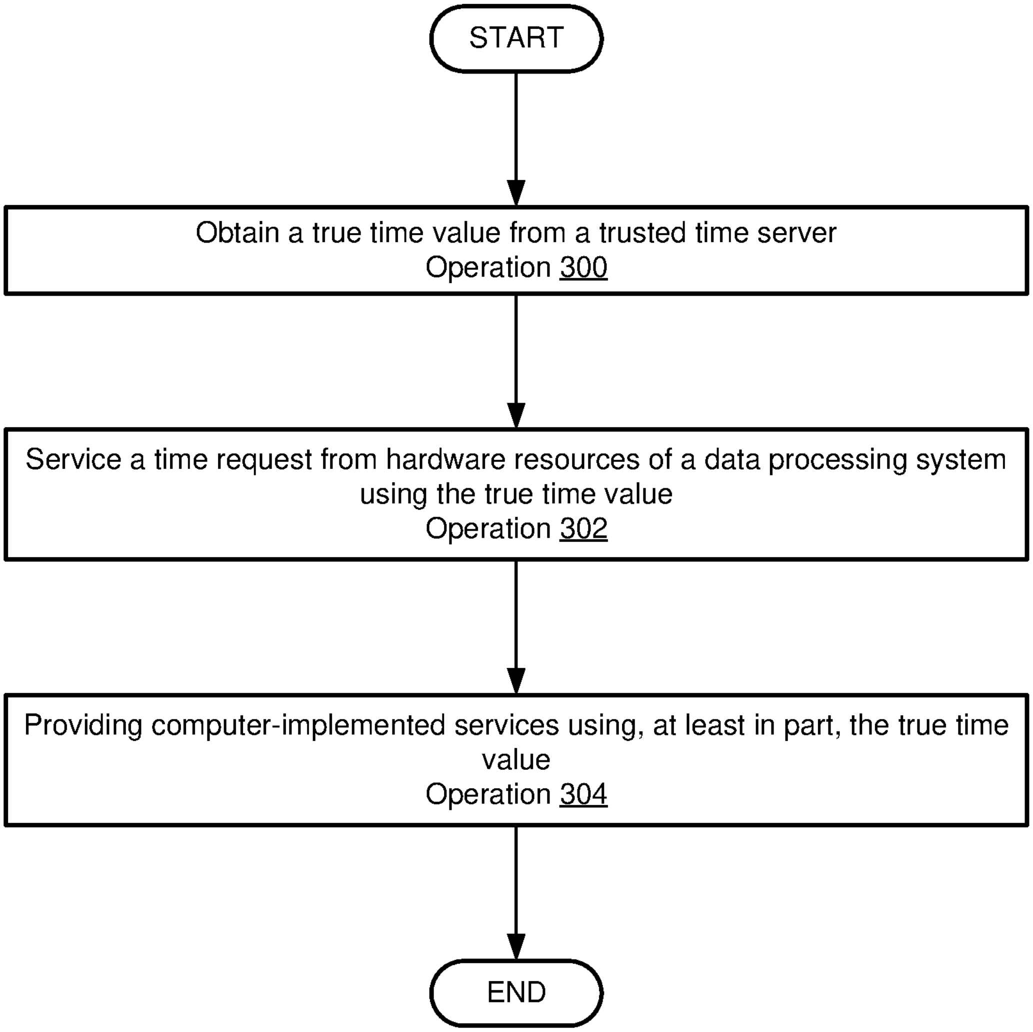
FIG. 3 shows a flow diagram illustrating a method of obtaining a true time value using a management controller in accordance with an embodiment.

When providing its functionality, components of data processing system 140 may perform all, or a portion, of the methods and operations illustrated in FIGS. 2A-3.

While illustrated in FIG. 1B with a limited number of specific components, a system may include additional, fewer, and/or different components without departing from embodiments disclosed herein.

Turning to FIG. 1C, to provide computer-implemented services, hardware resources 150 may host applications 193 and management entities 194. Management entities 194 may include, for example, drivers, operating systems, and/or other entities that facilitate operation of applications 193 by facilitating use of hardware resources 150. Hardware resources 150 may include processors, memory modules, storage devices, and/or other types of hardware components usable to provide computer-implemented services.

Applications 193 may provide any quantity and type of computer-implemented services using hardware components 190. When operating, applications 193 may use abstracted access to the functionality of hardware components 190 provided by management entities 194. For example, the applications may make calls to an operating system which in turn makes calls to drivers which in turn communicate with the hardware components to invoke their various functionalities.

In an embodiment, hardware resources 150 also hosts abstraction layer 191. Abstraction layer 191 may include software such as hypervisors, dockers, and/or other entities that provide abstracted access to hardware components to various abstracted environments (e.g., 192). The abstracted environments may include virtual machines, containers, etc. Through abstraction layer 191 and abstracted environments, hardware resources 150 may host various instances of management entities and applications that may utilize the functionalities of hardware components 190.

To facilitate cooperation between management controller 152 and hardware resources 150, hardware resources 150 may host management controller agent 195. Management controller agent 195 may be independent from the abstracted environments, and may facilitate communication with and performance of instructions by management controller 152.

For example, management controller agent 195 may include functionality to (i) monitor various abstracted environments, and components therein, (ii) identify operating states (e.g., nominal, stalled, in error of various levels of severity), (iii) obtain information regarding the states of the environments such as, for example, content of virtualized memory, processors, logs of operation of various software and/or abstracted hardware components, (iv) write data to and/or otherwise communicate with the entities in the virtualized environments, (v) make modifications to the virtualized environment and/or entities hosted thereby through invocation of various functions of abstraction layer 191 and/or other entities, (vi) adjust distribution of use of hardware components 190 by the abstracted environment, and/or (vii) perform other types of management actions through which information regarding the operation of entities hosted by abstracted environment 192 may be collected.

As discussed above, the components of FIGS. 1A-1C may perform various methods to obtain true time values for a data processing system. FIGS. 2A-3 may illustrate examples of methods that may be performed by the components of FIGS. 1A-1C. For example, a management controller similar to management controller 152 may perform all or a portion of the methods. In the diagrams discussed below and shown in FIGS. 2A-3, any of the operations may be repeated, performed in different orders, and/or performed in parallel with or in a partially overlapping in time manner with other operations.

To further clarify embodiments disclosed herein, an interaction diagram in accordance with an embodiment is shown in FIG. 2A. The interaction diagram may illustrate how data may be obtained and used within the system of FIGS. 1A-1C.

In the interaction diagram, processes performed by and interactions between components of a system in accordance with an embodiment are shown. In the diagram, components of the system are illustrated using a first set of shapes (e.g., management controller 202, server 204, etc.), located towards the top of the figure. Lines descend from these shapes. Interactions (e.g., communication, data transmissions, etc.) between the components of the system are illustrated using a second set of shapes (e.g., 208, 210, etc.) that extend between the lines. The second set of shapes may include lines terminating in one or two arrows. Lines terminating in a single arrow may indicate that one way interactions (e.g., data transmission from a first component to a second component) occur, while lines terminating in two arrows may indicate that multi-way interactions (e.g., data transmission between two components) occur.

Generally, the processes and interactions are temporally ordered in an example order, with time increasing from the top to the bottom of the page. For example, the interaction labeled as 208 may occur prior to the interaction labeled as 210. However, it will be appreciated that the processes and interactions may be performed in different orders, any may be omitted, and other processes or interactions may be performed without departing from embodiments disclosed herein.

Turning to FIG. 2A, the interaction diagram may illustrate processes and interactions that may occur while obtaining a true time value by a management controller (e.g., 202) of a data processing system via an interaction with a trusted time server (e.g., 206).

A data processing system (e.g., 140) may include management controller 202 and hardware resources (not shown). Management controller 202 may obtain a true time value from trusted time server 206 according to a schedule to increase a likelihood of clocks hosted by management controller 202 and/or the hardware resources being synchronized with a time maintained by trusted time server 206. The schedule may be previously determined (e.g., by a manufacturer of data processing system 140, by a downstream consumer of the computer-implemented services, etc.) and the schedule may be based on a likelihood that the clocks maintained by data processing system 140 have drifted over time since a previous synchronization event.

Trusted time server 206 may maintain a globally-implemented time standard and may provide information regarding the globally-implemented time standard (e.g., to data processing system 140). The globally-implemented time standard may be used to generate true time values. The true time values may be from a globally-recognized standard, such as Universal Coordinated Time (UTC).

At interaction 208, a request for a true time value may be provided by management controller 202 to server 204. The request for the true time value may be generated and provided to server 204 as a message using an out of band communication channel of the data processing system.

Server 204 may be similar to server 100 described in FIG. 1A and may include a message broker service. The message broker service may be responsible for directing communications between entities throughout a distributed environment. At interaction 210, server 204 may direct the request for the true time value to trusted time server 206.

Trusted time server 206 may retrieve the true time value (e.g., from storage, from another entity) and may provide, at interaction 212, the true time value to server 204 via the out of band communication channel. The true time value may reflect a time indicated by a globally-implemented time source (e.g., a nuclear clock). Trusted time server 206 may generate a data package including the true time value, may cryptographically sign the data package, and/or may perform other actions to increase security of data transmissions between trusted time server 206 and management controller 202.

The data package may include instructions (usable by server 204) indicating that the true time value is to be directed to management controller 202 via the out of band communication channel.

At interaction 214, server 204 may provide, via the out of band communication channel, the true time value to management controller 202. As described in FIG. 1B, data processing system 140 may include a network module that directs communications to management controller 202 or hardware resources 200 using either the out of band communication channel or the in band communication channel respectively. Therefore, the network module of data processing system 140 may receive the true time value and may direct the true time value to management controller 202 via the out of band communication channel.

By doing so, management controller 202 may obtain true time values while circumventing hardware resources 200. Consequently, management controller 202 may obtain true time values regardless of a powered state and/or a state of compromise of hardware resources 200. Doing so may reduce a likelihood of compromise of computer-implemented services provided by data processing system 140 using, at least in part, true time values.

Any of the processes illustrated using the second set of shapes and interactions illustrated using the second set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the interactions illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the processes and interactions may be implemented using any type and number of data structures. The data structures may be implemented using, for example, tables, lists, linked lists, unstructured data, data bases, and/or other types of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

Following obtaining the true time value by management controller 202, management controller may, via a side band communication channel of the data processing system, service a time request from hardware resources of the data processing system using the true time value. FIGS. 2B and 2C show two potential methods of servicing the time request. The management controller (and/or other entities) may service time requests via other methods using the true time value without departing from embodiments disclosed herein.

Turning to FIG. 2B, a data flow diagram illustrating a management controller of a data processing system (e.g., 140) interacting with hardware resources of the data processing system in accordance with an embodiment is shown. The data flow diagram may illustrate a first method of servicing a request for a true time value by software applications hosted by the hardware resources following the processes described in FIG. 2A.

In FIG. 2B, circles including numbers are used to indicate operations occurring at different points in time. For example, all operations described with reference to number one (1) may occur at a first point in time and all operations described with reference to the number two (2) may occur at a second point in time after the first point in time. While the operations are provided in an example temporal order (e.g., time point one before time point two), it will be appreciated that the operations may be performed in other orders from those illustrated and described herein.

At time point one (1), management controller 202 may provide, via side band communication channel 228, a true time value to hardware resources 200. The true time value may be the true time value obtained by management controller 202 from trusted time server 206 in FIG. 2A. Management controller 202 may provide the true time value automatically following receipt of the true time value from trusted time server 206.

Hardware resources 200 may host agent 222, clock 224, and software applications 226. Agent 222 may be similar to management controller agent 195 described in FIG. 1C. Clock 224 may be any hardware component responsible for maintaining a time standard for hardware resources 200. Upon receipt of the true time value, hardware resources 200 may update clock 224 via a synchronization process using the true time value (not shown). Therefore, a time indicated by clock 224 may be modified.

Software applications 226 may be similar to applications 193 described in FIG. 1C. Software applications 226 may be responsible for performing tasks as part of providing computer-implemented services. To perform the tasks, software applications 226 may query clock 224 (and/or another component of hardware resources 200) to obtain time data (e.g., a current time). Time data may be usable to determine, for example, whether data obtained from a remote entity is stale.

At time point two (2), software applications 226 may provide a request to clock 224. The request may be a time request and may indicate that software applications 226 is querying clock 224 for time data.

At time point three (3), clock 224 may provide the true time value to software applications 226. The true time value may be any time data that that is synchronized with a time indicated by trusted time server 206. By doing so, software applications 226 may provide computer-implemented services while reducing a likelihood of a man-in-the-middle attack or otherwise compromise of the data processing system.

Turning to FIG. 2C, a data flow diagram illustrating a management controller of a data processing system (e.g., 140) interacting with hardware resources of the data processing system in accordance with an embodiment is shown. The data flow diagram may illustrate a second method of servicing the request for a true time value by software applications hosted by the hardware resources following the processes described in FIG. 2A.

In FIG. 2C, circles including numbers are used to indicate operations occurring at different points in time. For example, all operations described with reference to number one (1) may occur at a first point in time and all operations described with reference to the number two (2) may occur at a second point in time after the first point in time. While the operations are provided in an example temporal order (e.g., time point one before time point two), it will be appreciated that the operations may be performed in other orders from those illustrated and described herein.

Hardware resources 200 may be similar to hardware resources 150 described in FIGS. 1B-1C and may include agent 222, clock 224, and software applications 226 as described in FIG. 2B.

At time point one (1) software applications 226 may provide a request to clock 224. The request may include a query for time data from clock 224. The request to clock 224 is shown as a dashed line to indicate that the request is intercepted by agent 222. Therefore, the request is obtained by agent 222 instead of clock 224 at time point one.

Agent 222 may intercept the request in order to increase a likelihood that any time data provided to software applications 226 is synchronized with a true time value obtained from trusted time server 206. Therefore, at time point two (2), agent 222 may provide, via side band communication channel 228, the request to management controller 202.

Management controller 202 may have previously received the true time value from trusted time server 206 (as described in FIG. 2A). Management controller 202 may maintain clock 220 and may have previously synchronized clock 220 using the true time value obtained from trusted time server 206.

Therefore, upon receiving the request, management controller 202 may provide, using clock 220 and at time point three (3), the true time value to agent 222 via side band communication channel 228.

At time point four (4), agent 222 may provide the true time value to software applications 226. By doing so, software applications 226 may provide computer-implemented services while reducing a likelihood of a man-in-the-middle attack or otherwise compromise of the data processing system.

In an embodiment, the one or more entities performing the operations shown in FIGS. 2B-2C are implemented using a processor adapted to execute computing code stored on a persistent storage that when executed by the processor performs the functionality of the system of FIGS. 1A-1C discussed throughout this application. The processor may be a hardware processor including circuitry such as, for example, a central processing unit, a processing core, or a microcontroller. The processor may be other types of hardware devices for processing information without departing from embodiments disclosed herein.

As discussed above, the components of FIGS. 1A-1C may perform various methods to manage data processing systems. FIG. 3 illustrates methods that may be performed by the components of FIGS. 1A-1C. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method of obtaining a true time value using a management controller in accordance with an embodiment is shown. The method may be performed, for example, by a management controller of a data processing system, software resources of a data processing system, hardware resources of a data processing system, and/or any other entity.

At operation 300, a true time value may be obtained from a trusted time server. Obtaining the true time value may include: (i) receiving, via an out of band communication channel, a data package from the trusted time server that includes the true time value, (ii) providing, via the out of band communication channel, a request for the true time value to the trusted time server and receiving, in response to the request, the true time value, and/or (iii) other methods. The true time value may be obtained at regular intervals according to a previously determined schedule.

At operation 302, a time request from hardware resources of the data processing system may be serviced.

In a first example, servicing the time request may include: (i) providing the true time value to the hardware resources, (ii) updating a clock of the hardware resources to obtain an updated clock using the true time value, (iii) obtaining a request for the true time value from a software application hosted by the hardware resources, (iv) providing, using the updated clock, the true time value to the software application, and/or (v) other methods.

Providing the true time value to the hardware resources may include: (i) transmitting, via a side band communication channel of the data processing system, the true time value in the form of a message to the hardware resources, (ii) storing the true time value in a storage architecture shared with the hardware resources, and/or (iii) other methods.

Updating a clock of the hardware resources may include: (i) directly modifying time data for the clock to synchronize the clock to a globally-implemented time standard using the true time value, (ii) providing the true time value to another entity responsible for modifying the clock, and/or (iii) other methods.

Obtaining the request for the true time value from the software application may include: (i) receiving a query, via an application programming interface (API) that facilitates interactions between hardware and/or software components of the data processing system, from the software application indicating the request, (ii) reading the request from storage, and/or (iii) other methods.

Providing the true time value to the software application may include: (i) sending, via an API, the true time value to the software application, (ii) storing the true time value in a storage architecture shared with the software application, and/or (iii) other methods.

In a second example, servicing the time request may include: (i) intercepting the time request from a software application hosted by the hardware resources, (ii) providing the intercepted time request to the management controller, (iii) receiving, in response to the providing, the true time value from the management controller, (iv) providing the true time value to the software application, and/or (v) other methods.

Intercepting the time request may include: (i) identifying that the software application issued a time request to the hardware resources, (ii) obtaining the time request (e.g., via an API), (iii) instructing the hardware resources not to respond to the request, and/or (iv) other methods.

Providing the intercepted time request may include: (i) transmitting, via the side band communication channel, the time request to the management controller in the form of a message, (ii) storing the time request in a storage architecture shared with the management controller, (iii) providing the time request to another entity responsible for transmitting the time request to the management controller, and/or (iv) other methods.

Receiving the true time value from the management controller may include: (i) obtaining, via the side band communication channel, the true time value in the form of a message from the management controller, (ii) reading the true time value from storage, and/or (iii) other methods.

Providing the true time value to the software application may include: (i) sending (via an API, via a side band communication channel, etc.) the true time value to the software application, (ii) storing the true time value in a storage architecture shared with the software application, and/or (iii) other methods.

At operation 304, computer-implemented services may be provided using, at least in part, the true time value. Providing the computer-implemented services may include: (i) obtaining data from a remote entity, (ii) cryptographically validating the data, (iii) checking, using the true time value, if the cryptographically validated data is stale, (iv) if the cryptographically validated data is stale: rejecting the data for use in the computer-implemented services, and/or (v) other methods.

Obtaining the data from the remote entity may include: (i) receiving, via an in band communication channel of the data processing system, the data from the remote entity in the form of a data package, message, etc., (ii) reading the data from storage, and/or (iii) other methods.

Cryptographically validating the data may include: (i) verifying, using a public key of a public private key pair, that the data is signed using a private key of the public private key pair, the public private key pair being maintained by the remote entity, (ii) reproducing a hashed value using a shared secret shared with the remote entity, and/or (iii) other methods utilizing shared secrets and/or other roots of trust.

Checking if the cryptographically validated data is stale may include: (i) obtaining a duration during which the cryptographically validated data is approved for use, (ii) determining how much time has elapsed since generation of the cryptographically validated data using a time stamp included with the cryptographically validated data and the true time value, (iii) comparing the duration of elapsed time to the duration during which the cryptographically validated data is approved for use, and/or (iv) if the duration of elapsed time is longer than the duration during which the cryptographically validated data is approved for use, labeling the cryptographically validated data as stale.

Rejecting the data for use in the computer-implemented services may include: (i) deleting the data, (ii) labeling the data as stale and storing the data, (iii) notifying the remote entity that the data is stale, and/or (iv) other methods.

The method may end following operation 304.

Figure 4:
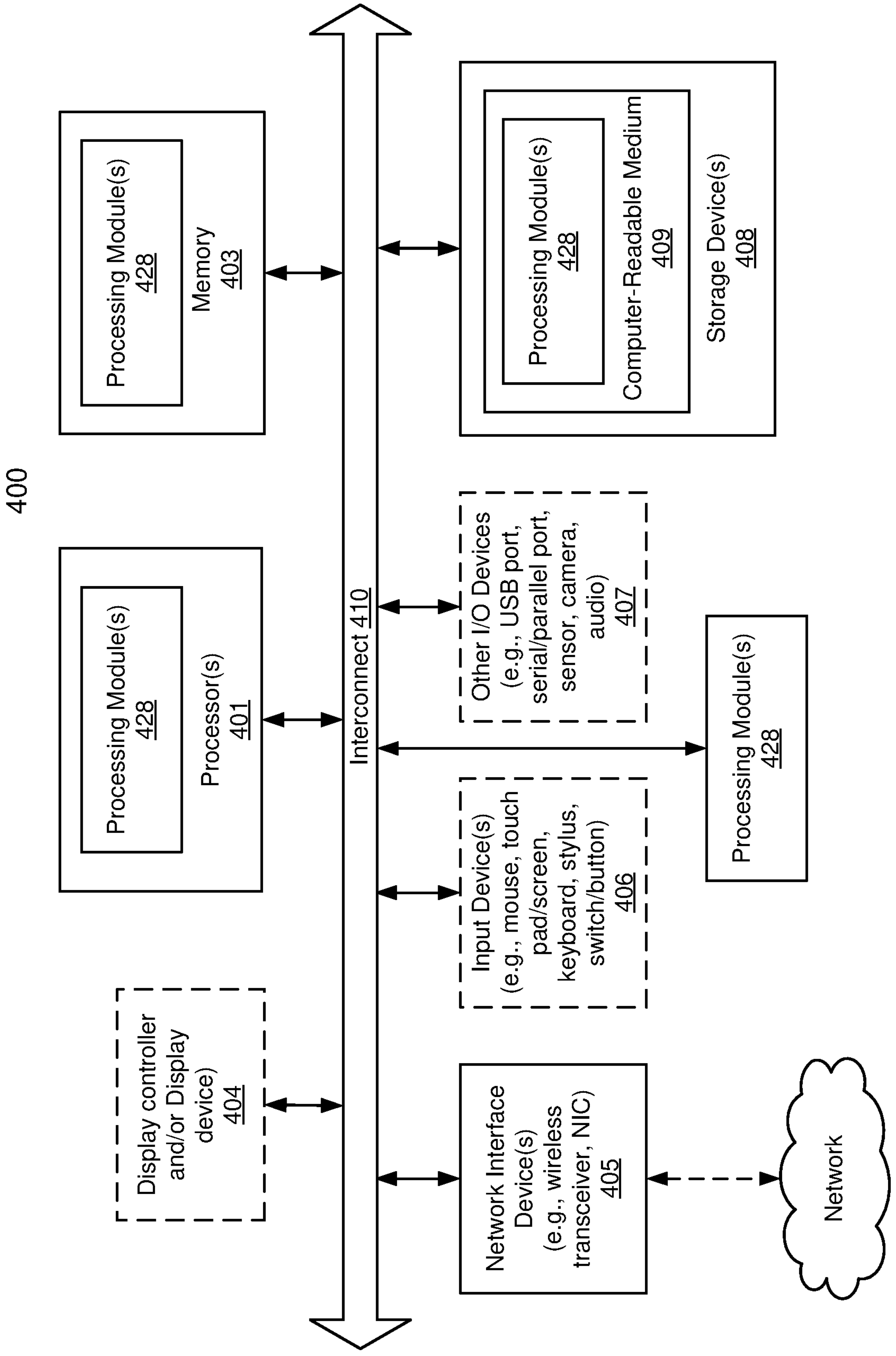
FIG. 4 shows a block diagram illustrating a data processing system in accordance with an embodiment.

Any of the components illustrated in FIGS. 1A-2C may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs, or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing a data processing system, the method comprising:

obtaining, by a management controller of the data processing system and via an out of band communication channel, a true time value from a trusted time server,
  wherein the true time value is provided to the management controller by a network module of the data processing system via the out of band communication channel, and
  wherein the network module is adapted to separately advertise network endpoints for the management controller and hardware resources of the data processing system, the network endpoints being usable by the trusted time server to address communications to the hardware resources using an in band communication channel and the management controller using the out of band communication channel;

servicing, by the management controller and via a side band communication channel, a time request from the hardware resources of the data processing system using the true time value; and providing, by the hardware resources, computer-implemented services using, at least in part, the true time value.

2. The method of claim 1, wherein servicing the time request comprises:

providing, by the management controller and via the side band communication channel, the true time value to the hardware resources;

updating, by the hardware resources, a clock of the hardware resources to obtain an updated clock using the true time value;

obtaining, by the hardware resources, a request for the true time value from a software application hosted by the hardware resources; and providing, by the hardware resources and using the updated clock, the true time value to the software application.

3. The method of claim 1, wherein servicing the time request comprises:

intercepting, by a management controller agent hosted by the hardware resources, the time request from a software application hosted by the hardware resources;

providing, by the management controller agent and via the side band communication channel, the intercepted time request to the management controller;

receiving, in response to the providing, the true time value from the management controller; and providing, by the management controller agent, the true time value to the software application.

4. The method of claim 1, wherein the trusted time server maintains a globally-implemented time standard and provides information regarding the globally-implemented time standard.

5. The method of claim 1, wherein the management controller and the network module are on separate power domains from the hardware resources so that the management controller and the network module are operable while the hardware resources are inoperable.

6. The method of claim 1, wherein the out of band communication channel runs through the network module, and the in band communication channel that services the hardware resources also runs through the network module.

7. The method of claim 1, wherein the network module hosts a transmission control protocol/internet protocol (TCP/IP) stack to facilitate network communications via the out of band communication channel.

8. The method of claim 1, wherein providing the computer-implemented services comprises:

obtaining, by the hardware resources, data from a remote entity;

cryptographically validating, by the hardware resources, the data; and checking, by the hardware resources and using the true time value, if the cryptographically validated data is stale; and in an instance of the checking where the cryptographically validated data is stale:

rejecting the data for use in the computer-implemented services.

9. A non-transitory machine-readable medium having instructions stored therein, which when executed by a processor, cause the processor to perform operations for managing a data processing system, the operations comprising:

obtaining, by a management controller of the data processing system and via an out of band communication channel, a true time value from a trusted time server, wherein the true time value is provided to the management controller by a network module of the data processing system via the out of band communication channel, and wherein the network module is adapted to separately advertise network endpoints for the management controller and hardware resources of the data processing system, the network endpoints being usable by the trusted time server to address communications to the hardware resources using an in band communication channel and the management controller using the out of band communication channel;

servicing, by the management controller and via a side band communication channel, a time request from the hardware resources of the data processing system using the true time value; and providing, by the hardware resources, computer-implemented services using, at least in part, the true time value.

10. The non-transitory machine-readable medium of claim 9, wherein servicing the time request comprises:

providing, by the management controller and via the side band communication channel, the true time value to the hardware resources;

updating, by the hardware resources, a clock of the hardware resources to obtain an updated clock using the true time value;

obtaining, by the hardware resources, a request for the true time value from a software application hosted by the hardware resources; and providing, by the hardware resources and using the updated clock, the true time value to the software application.

11. The non-transitory machine-readable medium of claim 9, wherein servicing the time request comprises:

intercepting, by a management controller agent hosted by the hardware resources, the time request from a software application hosted by the hardware resources;

providing, by the management controller agent and via the side band communication channel, the intercepted time request to the management controller;

receiving, in response to the providing, the true time value from the management controller; and providing, by the management controller agent, the true time value to the software application.

12. The non-transitory machine-readable medium of claim 9, wherein the trusted time server maintains a globally-implemented time standard and provides information regarding the globally-implemented time standard.

13. A data processing system, comprising:

a processor; and a memory coupled to the processor to store instructions, which when executed by the processor, cause the processor to perform operations for managing the data processing system, the operations comprising:

obtaining, by a management controller of the data processing system and via an out of band communication channel, a true time value from a trusted time server, wherein the true time value is provided to the management controller by a network module of the data processing system via the out of band communication channel, and wherein the network module is adapted to separately advertise network endpoints for the management controller and hardware resources of the data processing system, the network endpoints being usable by the trusted time server to address communications to the hardware resources using an in band communication channel and the management controller using the out of band communication channel;

servicing, by the management controller and via a side band communication channel, a time request from the hardware resources of the data processing system using the true time value; and providing, by the hardware resources, computer-implemented services using, at least in part, the true time value.

14. The data processing system of claim 13, wherein servicing the time request comprises:

providing, by the management controller and via the side band communication channel, the true time value to the hardware resources;

updating, by the hardware resources, a clock of the hardware resources to obtain an updated clock using the true time value;

obtaining, by the hardware resources, a request for the true time value from a software application hosted by the hardware resources; and providing, by the hardware resources and using the updated clock, the true time value to the software application.

15. The data processing system of claim 13, wherein servicing the time request comprises:

intercepting, by a management controller agent hosted by the hardware resources, the time request from a software application hosted by the hardware resources;

providing, by the management controller agent and via the side band communication channel, the intercepted time request to the management controller;

receiving, in response to the providing, the true time value from the management controller; and providing, by the management controller agent, the true time value to the software application.

16. The data processing system of claim 13, wherein the trusted time server maintains a globally-implemented time standard and provides information regarding the globally-implemented time standard.

17. The data processing system of claim 13, wherein the management controller and the network module are on separate power domains from the hardware resources so that the management controller and the network module are operable while the hardware resources are inoperable.

18. The data processing system of claim 13, wherein the out of band communication channel runs through the network module, and the in band communication channel that services the hardware resources also runs through the network module.

19. The data processing system of claim 13, wherein the network module hosts a transmission control protocol/internet protocol (TCP/IP) stack to facilitate network communications via the out of band communication channel.

20. The data processing system of claim 13, wherein providing the computer-implemented services comprises:

obtaining, by the hardware resources, data from a remote entity;

cryptographically validating, by the hardware resources, the data; and checking, by the hardware resources and using the true time value, if the cryptographically validated data is stale; and in an instance of the checking where the cryptographically validated data is stale:

rejecting the data for use in the computer-implemented services.

* * * * *